US012753812B2

(12) United States Patent
Shahin

(10) Patent No.: US 12,753,812 B2
(45) Date of Patent: Oct. 6, 2026

(54) DRUM BRAKE AND METHOD OF OPERATING THE SAME

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek si (KR)

( * ) Notice: Subject to any disclaimer, the term of this patent is extended or adjusted under 35 U.S.C. 154(b) by 471 days.

(21) Appl. No.: 18/385,100

(22) Filed: Oct. 30, 2023

(65) Prior Publication Data

US 2024/0392848 A1 Nov. 28, 2024

(30) Foreign Application Priority Data

May 26, 2023 (DE) ......................... 102023204990.2

(51) Int. Cl.
*F16D 65/09* (2006.01)
*F16D 51/20* (2006.01)

(52) U.S. Cl.
CPC ............. *F16D 65/09* (2013.01); *F16D 51/20* (2013.01); *F16D 2200/0034* (2013.01); *F16D 2250/0046* (2013.01)

(58) Field of Classification Search
CPC ................................. F16D 65/09; F16D 51/20
See application file for complete search history.

(56) References Cited

U.S. PATENT DOCUMENTS

2012/0103737 A1 * 5/2012 Drewes ................... F16D 51/20 188/219.1
2019/0344761 A1 11/2019 Cho

FOREIGN PATENT DOCUMENTS

CN 209569281 U 11/2019
DE 102019135560 9/2020
KR 10-0858339 B1 9/2008
KR 10-2023-0034694 A 3/2023

OTHER PUBLICATIONS

German Patent and Trademark Office, German Patent Application No. 102023204990.2, Office Action dated Nov. 30, 2023, 9 pages.

* cited by examiner

*Primary Examiner* — Robert A. Siconolfi
*Assistant Examiner* — Shea Woodrow Irvin
(74) *Attorney, Agent, or Firm* — LEE, HONG, DEGERMAN, KANG & WAIMEY

(57) ABSTRACT

The disclosed drum brake includes a drum including a fastening part fastened to a wheel of a vehicle and a side surface part so that the drum has a cylindrical shape of which one side is open, a pair of brake shoes configured to generate a braking force by rubbing against an inner circumferential surface of the side surface part, a joint rotatably provided on the inner circumferential surface of the side surface part and including a first lever formed to protrude along an outer circumferential surface of each of the brake shoes and a second lever formed to protrude toward an inner surface of the fastening part, and a flap of which one side is fixed to the inner surface of the fastening part and the other side is formed to protrude toward an open surface of the drum, wherein the flap rotates the joint so that the other side is bent outward due to a centrifugal force according to rotation of the drum to press the second lever and the first lever supports the brake shoe.

16 Claims, 5 Drawing Sheets

DRUM BRAKE AND METHOD OF OPERATING THE SAME

CROSS-REFERENCE TO RELATED APPLICATION

This application claims the benefit of German Patent Application No. 102023204990.2, filed on May 26, 2023, in the German Patent Office (DPMA), the disclosures of which are incorporated herein by reference in its entirety.

BACKGROUND

1. Technical Field

Embodiments of the present disclosure relate to a drum brake of a vehicle and a method of operating the same, and more specifically, to a drum brake of a vehicle in which a component is provided so that a constant distance is maintained between a brake shoe and an inner circumferential surface of a brake drum when the drum brake does not perform braking.

2. Description of the Related Art

In general, vehicles necessarily include brake systems for braking. A drum brake is one of such brake systems. The braking principle of the drum brake is to press a brake shoe, to which a lining (a friction material) is attached, against an inner circumferential surface of a brake drum which is positioned inside and rotates with a wheel to generate a friction force and to use the friction force as a braking force.

That is, when the vehicle performs braking, the brake shoe comes into contact with the inner circumferential surface of the brake drum, and when the vehicle travels, components of the brake drum are driven to maintain a constant distance between the inner circumferential surface of the drum and the brake shoe.

However, due to the influence of a traveling direction, pressures applied to the brake drum and the brake shoe of the drum brake are asymmetrical, and a problem that a distance between the drum and the brake shoe is not constant due to such influence occurs. In particular, a phenomenon in which the drum and the brake shoe come into contact with each other while the vehicle travels has occurred, and such a drag torque phenomenon has reduced the fuel efficiency of the vehicle and the durability of the brake.

The conventional drum brake was additionally provided with a return spring which elastically supports a pair of brake shoes inward in order to solve such a problem.

However, there is a limit to maintaining the distance between the brake shoe and the drum by using only the return spring, and there is also a disadvantage of a configuration of the return spring itself. Accordingly, there is a demand for a component which replaces the return spring or is provided as a separate component from the return spring to maintain the distance between the brake shoe and the drum when the drum brake does not perform braking, and a method of operating the same.

SUMMARY

Therefore, it is an aspect of the present disclosure to provide a drum brake in which a constant distance between a brake shoe and a drum is maintained when the drum brake of a vehicle does not perform braking, and a method of operating the same.

It is another aspect of the present disclosure to provide a drum brake in which an external force is provided in a restoration direction of a brake shoe by using a centrifugal force of a rotating drum when the drum brake of a vehicle does not perform braking, and a method of operating the same.

It is still another aspect of the present disclosure to provide a drum brake in which an inner space of the drum brake of a vehicle is efficiently used, and a method of operating the same.

In accordance with one aspect of the present disclosure, a drum brake includes a drum including a fastening part fastened to a wheel of a vehicle and a side surface part so that the drum has a cylindrical shape of which one side is open, a pair of brake shoes configured to generate a braking force by rubbing against an inner circumferential surface of the side surface part, a joint rotatably provided on the inner circumferential surface of the side surface part and including a first lever formed to protrude along an outer circumferential surface of each of the brake shoes and a second lever formed to protrude toward an inner surface of the fastening part, and a flap of which one side is fixed to the inner surface of the fastening part and the other side is formed to protrude toward an open surface of the drum, wherein the flap rotates the joint so that the other side is bent outward due to a centrifugal force according to rotation of the drum to press the second lever and the first lever supports the brake shoe.

The first lever may support the outer circumferential surface of the brake shoe inward according to rotation of the joint.

The flap may be formed of a light material so that the other side is bent due to the centrifugal force according to the rotation of the drum.

The flap may be formed of a plastic material.

The joint may be provided as a plurality of joints to support both the pair of brake shoes.

The joint may be provided as one joint and formed to extend along the inner circumferential surface of the side surface part to support both the pair of brake shoes.

The joint may be disposed on the inner circumferential surface of the side surface part so that a length of the second lever and a length of the first lever are different from each other.

A length of the second lever may be greater than a length of the first lever.

A coating treatment may be performed on a portion of the first lever configured to come into contact with the brake shoe to reduce a friction force.

The brake shoe may include an accommodation groove at one side of the brake shoe to accommodate the first lever in a case in which the joint does not rotate.

The drum brake may include an elastic part of which one side is connected to the inner surface of the fastening part and the other side is connected to the flap to elastically support the flap inward.

One side of the elastic part may be disposed further inward than the flap, and the other side may be connected to an inner surface of the flap.

The joint may be provided so that an angle between the first lever and the second lever is 90 degrees or more.

In accordance with another aspect of the present disclosure, a method of operating a drum brake including a drum including a fastening part fastened to a wheel of a vehicle and a side surface part so that the drum has a cylindrical shape of which one side is open, a pair of brake shoes configured to generate a braking force by rubbing against an inner circumferential surface of the side surface part, a joint rotatably provided on the inner circumferential surface of the side surface part and including a first lever formed to protrude along an outer circumferential surface of each of the brake shoes and a second lever formed to protrude toward an inner surface of the fastening part, and a flap of which one side is fixed to the inner surface of the fastening part and the other side is formed to protrude toward an open surface of the drum is provided, wherein in a case in which the drum brake is in a braking state, the first lever is disposed in a horizontal direction, and in a case in which the drum brake is in a non-braking state, the other side of the flap is bent outward and presses the second lever due to a centrifugal force according to rotation of the drum, and the pressured second lever rotates the joint so that the first lever supports the outer circumferential surface of the brake shoe inward.

The brake shoe may include an accommodation groove at one side to accommodate the first lever in a case in which the joint does not rotate, and in the case in which the drum brake is in the braking state, the first lever may be accommodated in the accommodation groove, and one surface of the brake shoe may be in close contact with the inner circumferential surface of the side surface part.

The drum brake may include an elastic part of which one side is connected to the inner surface of the fastening part and the other side is connected to the flap to elastically support the flap inward, wherein in the case in which the drum brake is in the braking state, the elastic part may elastically support the flap inward for the flap to be spaced apart from the second lever.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EMBODIMENTS

Figure 1:
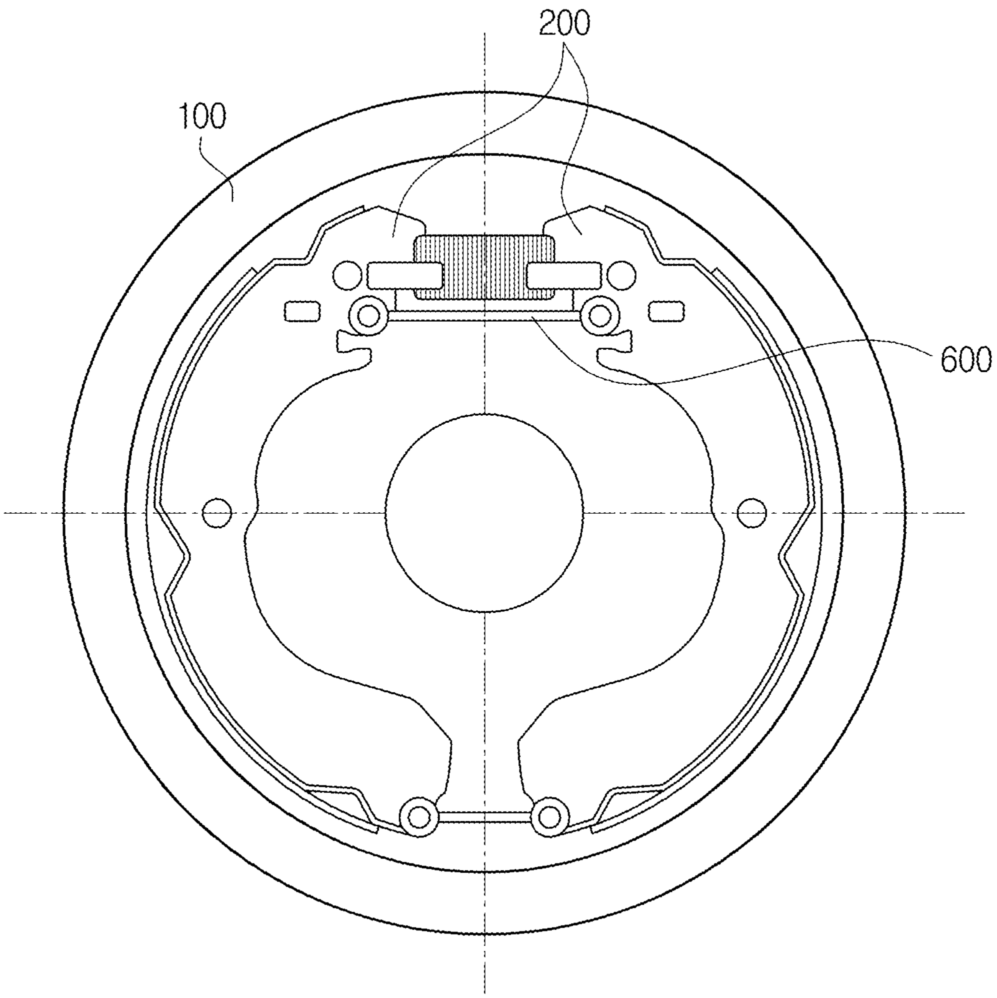
FIG. 1 is a front view illustrating an overall shape of a conventional drum brake.

Hereinafter, embodiments of the present disclosure will be described in detail with reference to the accompanying drawings. The following embodiments are provided to sufficiently convey the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

Figure 2:
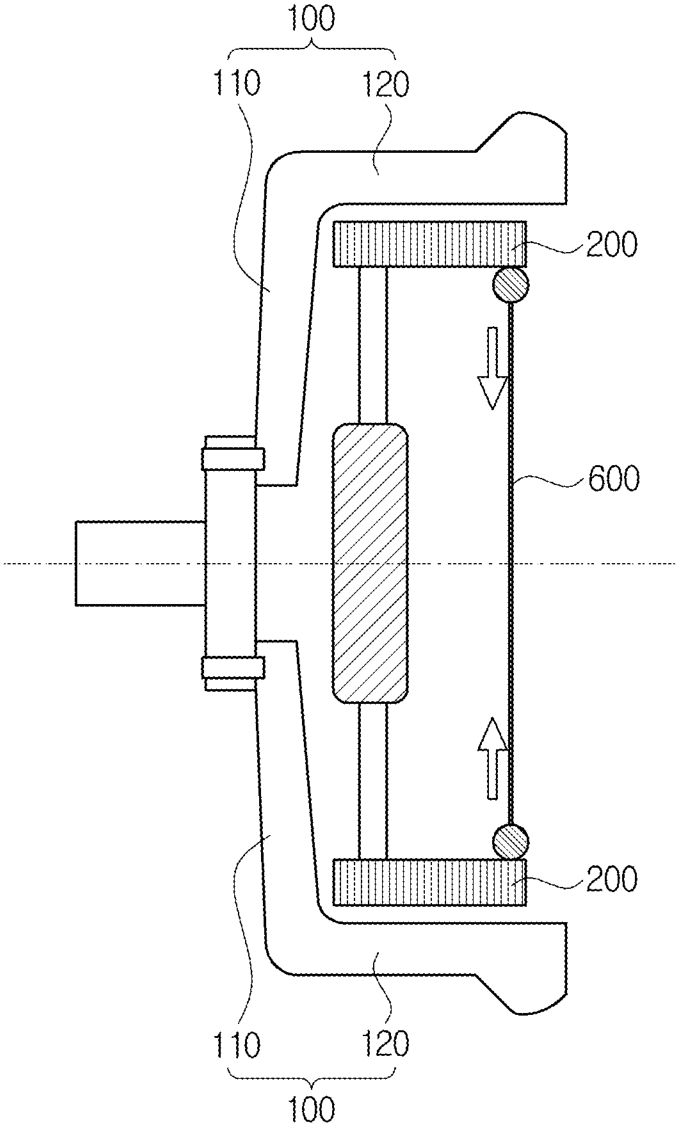
FIG. 2 is a side cross-sectional view illustrating the conventional drum brake including a return spring in a non-braking state.

FIG. 1 is a front view illustrating an overall shape of a conventional drum brake, and FIG. 2 is a side cross-sectional view illustrating the conventional drum brake including a return spring in a non-braking state.

Referring to FIGS. 1 and 2, the conventional drum brake of a vehicle is provided with a drum 100 forming an exterior, a pair of brake shoes 200 disposed in the drum 100, and a wheel cylinder configured to move the brake shoes 200 toward an inner circumferential surface of the drum 100. In this case, the wheel cylinder may be electronically or hydraulically driven and may be provided as one wheel cylinder or two wheel cylinders.

In the drum brake, pressures applied to the drum 100 and the brake shoe 200 are asymmetric due to an influence of a traveling direction, and due to such influence, there is a problem that a distance between the drum 100 and the brake shoe 200 is not constant. In particular, a drag torque phenomenon in which the drum 100 and the brake shoe 200 come into contact with each other while the vehicle travels may occur, and in this case, a problem of reducing the fuel efficiency of the vehicle and the durability of the brake occurs.

In order to prevent such problems, the conventional drum brake includes a return spring 600 provided between the pair of brake shoes 200. As illustrated in FIG. 2, when the brake of the vehicle is in the non-braking state, the return spring 600 pulls the pair of brake shoes 200 inward so that the inner circumferential surface of the drum 100 is spaced apart from an outer circumferential surface of each of the brake shoes 200.

However, with only the return spring 600, there is a limit to maintaining the distance between the drum 100 and the brake shoe 200 while the vehicle travels, and in particular, when the brake starts braking to stop the traveling vehicle, the return spring still pulls the brake shoes 200 inward and thus there is a problem of increasing a load of the wheel cylinder.

Accordingly, the present disclosure solves the above problems by providing a configuration of a joint 300 and a flap 400.

Figure 3:
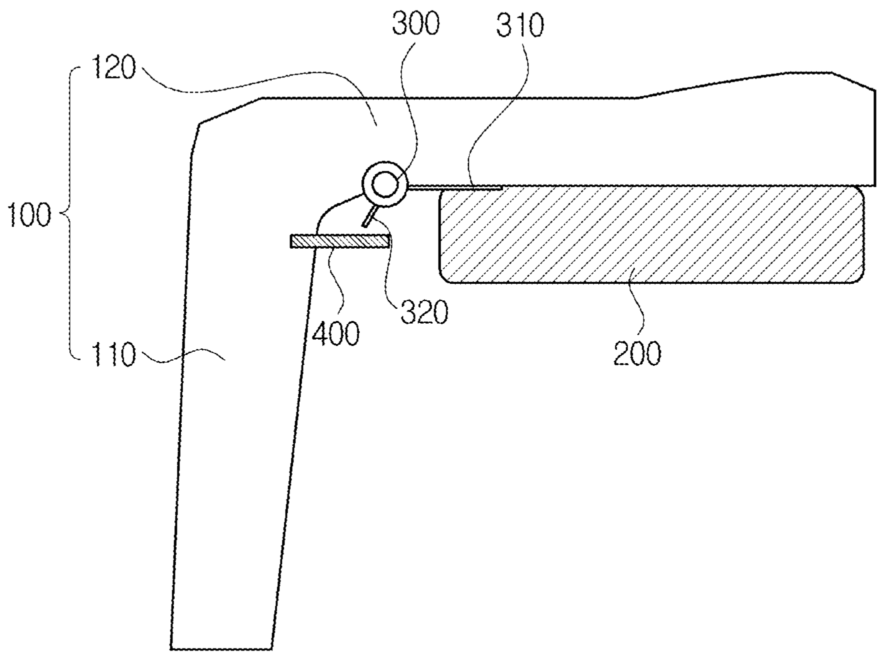
FIG. 3 is an enlarged side cross-sectional view illustrating a drum brake in a braking state according to a first embodiment of the present disclosure.

FIG. 3 is an enlarged side cross-sectional view illustrating a drum brake in a braking state according to a first embodiment of the present disclosure.

Referring to FIG. 3, the drum brake according to the first embodiment of the present disclosure includes a drum 100 and a brake shoe 200, which are general components of a drum brake, and includes a joint 300, which includes a first lever 310 and a second lever 320, and a flap 400.

The drum 100 is a component forming an exterior of the drum brake and is provided in a cylindrical shape of which one side is open. That is, the drum 100 includes a fastening part 110 forming one surface and fastened to a wheel of a vehicle and a side surface part 120 forming a side surface.

The brake shoe 200 is provided as a pair of brake shoes 200 in the drum 100. The brake shoe 200 is disposed to face an inner circumferential surface of the side surface part 120, and a braking force of the brake is generated by friction between an outer circumferential surface of the brake shoe 200 and the inner circumferential surface of the side surface part 120.

In the present disclosure, expressions such as “inward,” “outward,” “inner surface,” “outer surface,” “inner circumferential surface,” and “outer circumferential surface” are used. For example, there are expressions such as supported inward, bent outward, connected to an inner surface, the inner circumferential surface of the side surface part 120, or the outer circumferential surface of the brake shoe 200. In this case, based on FIG. 2, “inward” is a direction toward a central axis of the drum 100, “outward” is a direction opposite to the direction toward the central axis of the drum 100, an inner surface and an inner circumferential surface are surfaces formed at inner sides, and an outer surface and an outer circumferential surface are surfaces formed at outer sides. Hereinafter, all expressions such as "inward," "outside," "inner surface," "outer surface," "inner circumferential surface," and "outer circumferential surface" can be understood as described above.

The joint 300 is disposed on the inner circumferential surface of the side surface part 120 and is rotatably provided. One side of the joint 300 includes the first lever 310 formed to protrude along the outer circumferential surface of the brake shoe 200, and the other side of the joint 300 includes a second lever 320 formed to protrude toward an inner surface of the fastening part 110.

The first lever 310 is formed to support the outer circumferential surface of the brake shoe 200 inward according to rotation of the joint 300. A coating treatment is performed on a portion of the first lever 310 coming into contact with the brake shoe 200 to reduce a friction force. Accordingly, wear of the first lever 310 can be prevented. The same coating treatment may also be performed on the second lever 320 and the flap 400.

The second lever 320 is disposed at a predetermined angle with respect to the first lever 310. In this case, the angle between the second lever 320 and the first lever 310 may be at least 90 degrees or more.

In the drum brake, the second lever 320 and the first lever 310 are disposed on the inner circumferential surface of the side surface part 120 so that a length of the second lever 320 and a length of the first lever 310 are different from each other. Specifically, as in the first embodiment of the present disclosure, the length of the first lever 310 may be greater than the length of lever 320.

However, the length of the second lever 320 and the length of the first lever 310 of the present disclosure are not limited to the first embodiment, and the present disclosure includes a case in which a position of the joint 300 is appropriately adjusted according to types of the drum 100 and the brake shoe 200 so that the length of the first lever 310 and the length of the second lever 320 are the same, or the length of the first lever 310 is greater than the length of the second lever 320. Accordingly, due to the principle of leverage, a force of the first lever 310 supporting the brake shoe 200 may be greater than a force of the flap 400 applied to the second lever 320.

One side of the flap 400 is fixed to the inner surface of the fastening part 110, and the other side is formed to protrude toward an open surface of the drum 100. The flap 400 may rotate the joint 300 so that the other side of the flap 400 is bent outward due to a centrifugal force according to rotation of the drum 100 to press the second lever 320 and the first lever 310 supports the brake shoe 200. Accordingly, an external force may be provided in a restoration direction of the brake shoe 200 by using the centrifugal force of the drum 100 to maintain a constant distance between the brake shoe 200 and the drum 100 while the drum brake does not perform braking. When the rotation of the drum 100 is stopped, the flap 400 does not provide the external force to the brake shoe 200 and thus does not apply a load to the wheel cylinder unlike a return spring. In addition, the flap 400 can more stably prevent a drag torque on a fast-traveling vehicle because the external force applied to the brake shoe 200 becomes stronger as a wheel of the vehicle rotates faster.

The flap 400 may be formed of a light material so that the other side of the flap 400 is bent due to the centrifugal force according to the rotation of the drum 100. For example, the flap 400 may be formed of a plastic material.

The joint 300 is provided on the side surface part 120 of the drum 100 and is provided in a space between the fastening part 110 and the brake shoe 200. Accordingly, since an additional space required for a component for maintaining the constant distance between the brake shoe 200 and an inner circumferential surface of the drum 100 is not required, an inner space of the drum brake can be efficiently used.

The joint 300 is provided to support both the pair of brake shoes 200. The joint 300 may be provided as a plurality of joints 300 and disposed on each of the pair of brake shoes 200, and the joint 300 may be provided as one joint 300 to extend along the side surface part 120 so as to support both the pair of brake shoes 200.

Figure 5:
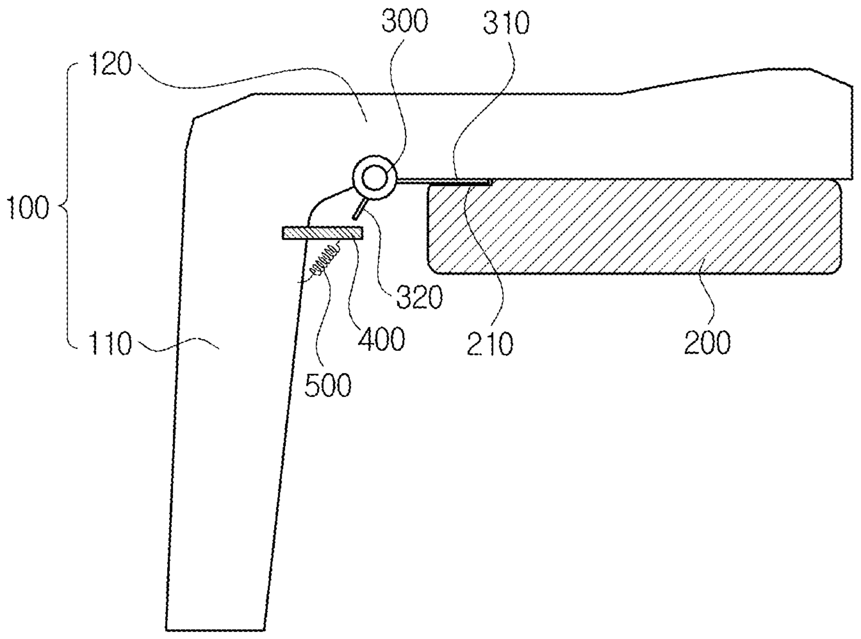
FIG. 5 is an enlarged side cross-sectional view illustrating a drum brake in a braking state according to a second embodiment of the present disclosure.

FIG. 5 is an enlarged side cross-sectional view illustrating a drum brake in a braking state according to a second embodiment of the present disclosure.

Referring to FIG. 5, the drum brake according to the second embodiment of the present disclosure includes all the components of the first embodiment and further includes an elastic part 500 and an accommodation groove 210 provided in a brake shoe 200.

One side of the elastic part 500 may be connected to an inner surface of a fastening part 110 and the other side may be connected to a flap 400. That is, one side of the elastic part 500 may be disposed further inward than the flap 400, and the other side may be connected to an inner surface of the flap 400. Accordingly, the elastic part 500 elastically supports the flap 400 inward so that the flap 400 and a second lever 320 are spaced apart from each other when a brake of a vehicle is in the braking state. The elastic part 500 may be provided as a rubber band or a spring.

The accommodation groove 210 may be provided at one side of the brake shoe 200 so that a first lever 310 is accommodated in the accommodation groove 210 when a joint 300 does not rotate. When the brake of the vehicle is in the braking state, the outer circumferential surface of the brake shoe 200 and the inner circumferential surface of the side surface part 120 may be in close contact with each other to completely generate a friction force, however, when the first lever 310 is interposed between the brake shoe 200 and the side surface part 120, both the components are not completely in close contact with each other. Accordingly, there are problems that a braking force of the brake is reduced and the first lever 310 is also worn. In this case, a height of the accommodation groove 210 may be greater than a thickness of the first lever 310. Referring to FIG. 3, in the first embodiment of the present disclosure, the accommodation groove 210 may form a space in which the first lever 310 may be accommodated when the brake of the vehicle is in the braking state, an outer circumferential surface of the brake shoe 200 excluding the accommodation groove 210 and an inner circumferential surface of the side surface part 120 can be in completely close contact with each other, and wear of the first lever 310 can be minimized when the brake is in the braking state.

Hereinafter, a method of operating the drum brake according to the embodiment of the present disclosure will be described.

Figure 4:
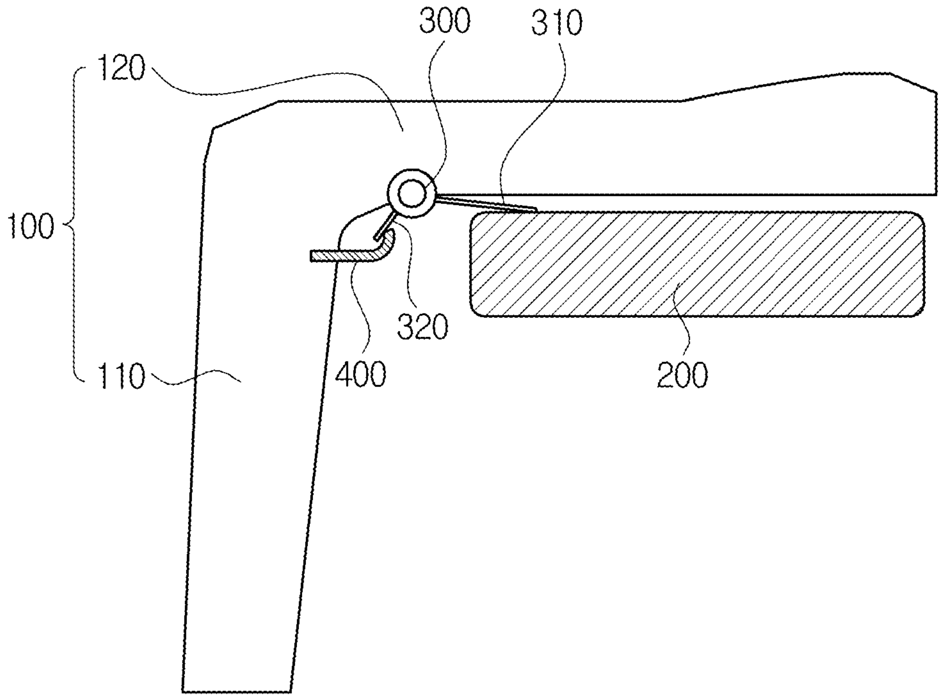
FIG. 4 is an enlarged side cross-sectional view illustrating the drum brake in a non-braking state according to the first embodiment of the present disclosure.

FIG. 4 is an enlarged side cross-sectional view illustrating the drum brake in a non-braking state according to the first embodiment of the present disclosure; and Referring to FIGS. 3 and 4, when the drum brake according to the first embodiment of the present disclosure is switched from the braking state to the non-braking state, movement of the flap 400 and the joint 300 can be checked.

First, when the drum brake is in the braking state, the joint 300 is positioned so that the first lever 310 is disposed in a horizontal direction. In this case, the flap 400 is disposed in the horizontal direction and spaced apart from the second lever 320.

Then, when the drum brake is in the non-braking state, the other side of the flap 400 is bent outward due to a centrifugal force according to rotation of the drum 100 and presses the second lever 320. Accordingly, the pressed second lever 320 rotates the joint 300, and thus the first lever 310 supports the outer circumferential surface of the brake shoe 200 inward. Accordingly, the outer circumferential surface of the brake shoe 200 is spaced a certain distance from the inner circumferential surface of the fastening part 110.

Referring to FIG. 5, movement of the flap 400 and the joint 300 may be checked in the drum brake according to the second embodiment of the present disclosure in the braking state.

When the drum brake is in the braking state, the first lever 310 is accommodated in the accommodation groove 210 so that one surface of the brake shoe 200 may be in close contact with the inner circumferential surface of the side surface part 120, and the elastic part 500 elastically supports the flap 400 inward so that the flap 400 may be spaced apart from the second lever 320.

The drum brake having such a configuration according to the embodiments of the present disclosure includes the joint 300, which includes the first lever 310 and the second lever 320, and the flap 400, and provides an external force in a restoration direction of the brake shoe 200 using a centrifugal force of the rotating drum 100 when the drum brake of the vehicle does not perform braking. Accordingly, a constant distance between the brake shoe 200 and the drum 100 can be maintained. In addition, the joint 300 and the flap 400 can maintain the constant distance between the brake shoe 200 and the drum 100 with the return spring 600 provided in the conventional drum brake and replace the return spring 600 to eliminate a disadvantage of the return spring 600.

As is apparent from the above description, a present embodiment provides a drum brake in which a constant distance between a brake shoe and a drum is maintained when the drum brake of a vehicle does not perform braking, and a method of operating the same.

A present embodiment provides a drum brake in which an external force is provided in a restoration direction of a brake shoe by using a centrifugal force of a rotating drum when the drum brake of a vehicle does not perform braking, and a method of operating the same.

A present embodiment provides a drum brake in which an inner space of the drum brake of a vehicle is efficiently used, and a method of operating the same.

What is claimed is:

1. A drum brake comprising:

a drum including a fastening part fastened to a wheel of a vehicle and a side surface part so that the drum has a cylindrical shape of which one side is open;

a pair of brake shoes configured to generate a braking force by rubbing against an inner circumferential surface of the side surface part;

a joint rotatably provided on the inner circumferential surface of the side surface part and including a first lever formed to protrude along an outer circumferential surface of each of the brake shoes and a second lever formed to protrude toward an inner surface of the fastening part; and a flap of which one side is fixed to the inner surface of the fastening part and the other side is formed to protrude toward an open surface of the drum, wherein the flap rotates the joint so that the other side is bent outward due to a centrifugal force according to rotation of the drum to press the second lever and the first lever supports the brake shoe.

2. The drum brake of claim 1, wherein the first lever supports the outer circumferential surface of the brake shoe inward according to rotation of the joint.

3. The drum brake of claim 1, wherein the flap is formed of a light material so that the other side is bent due to the centrifugal force according to the rotation of the drum.

4. The drum brake of claim 3, wherein the flap is formed of a plastic material.

5. The drum brake of claim 1, wherein the joint is provided as a plurality of joints to support both the pair of brake shoes.

6. The drum brake of claim 1, wherein the joint is provided as one joint and formed to extend along the inner circumferential surface of the side surface part to support both the pair of brake shoes.

7. The drum brake of claim 1, wherein the joint is disposed on the inner circumferential surface of the side surface part so that a length of the second lever and a length of the first lever are different from each other.

8. The drum brake of claim 6, wherein a length of the second lever is greater than a length of the first lever.

9. The drum brake of claim 1, wherein a coating treatment is performed on a portion of the first lever configured to come into contact with the brake shoe.

10. The drum brake of claim 9, wherein the brake shoe includes an accommodation groove at one side of the brake shoe to accommodate the first lever in a case in which the joint does not rotate.

11. The drum brake of claim 1, comprising an elastic part of which one side is connected to the inner surface of the fastening part and the other side is connected to the flap to elastically support the flap inward.

12. The drum brake of claim 11, wherein:

one side of the elastic part is disposed further inward than the flap; and the other side is connected to an inner surface of the flap.

13. The drum brake of claim 1, wherein the joint is provided so that an angle between the first lever and the second lever is 90 degrees or more.

14. A method of operating a drum brake including a drum including a fastening part fastened to a wheel of a vehicle and a side surface part so that the drum has a cylindrical shape of which one side is open, a pair of brake shoes configured to generate a braking force by rubbing against an inner circumferential surface of the side surface part, a joint rotatably provided on the inner circumferential surface of the side surface part and including a first lever formed to protrude along an outer circumferential surface of each of the brake shoes and a second lever formed to protrude toward an inner surface of the fastening part, and a flap of which one side is fixed to the inner surface of the fastening part and the other side is formed to protrude toward an open surface of the drum, wherein:

in a case in which the drum brake is in a braking state, the first lever is disposed in a horizontal direction; and in a case in which the drum brake is in a non-braking state, the other side of the flap is bent outward and presses the second lever due to a centrifugal force according to rotation of the drum, and the pressured second lever rotates the joint so that the first lever supports the outer circumferential surface of the brake shoe inward.

15. The method of claim 14, wherein:

the brake shoe includes an accommodation groove at one side to accommodate the first lever in a case in which the joint does not rotate; and in the case in which the drum brake is in the braking state, the first lever is accommodated in the accommodation groove, and one surface of the brake shoe is in close contact with the inner circumferential surface of the side surface part.

16. The method of claim 14, wherein:

the drum brake includes an elastic part of which one side is connected to the inner surface of the fastening part and the other side is connected to the flap to elastically support the flap inward; and in the case in which the drum brake is in the braking state, the elastic part elastically supports the flap inward for the flap to be spaced apart from the second lever.

* * * * *